United States Patent Office 3,439,684
Patented Apr. 22, 1969

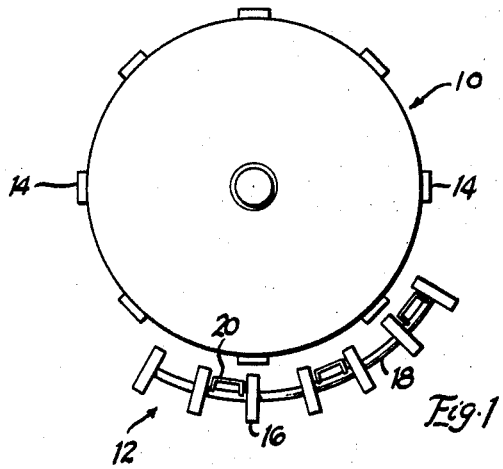
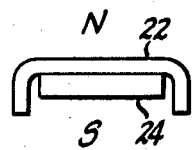
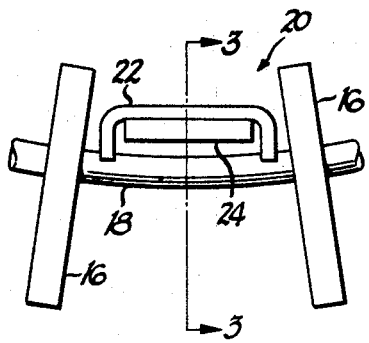
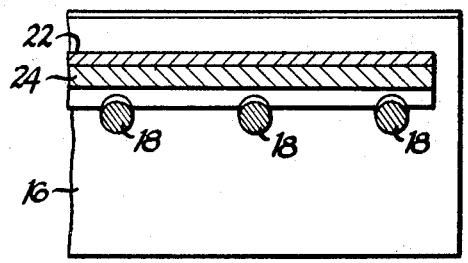
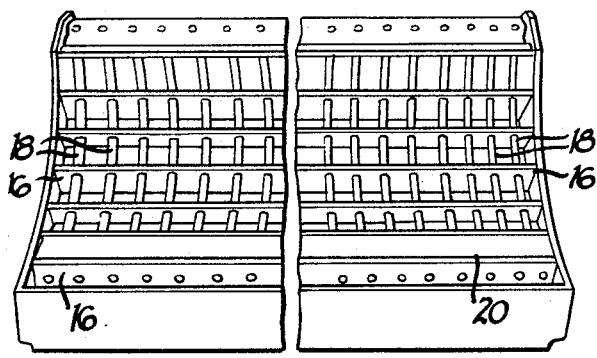
INVENTORS
Martin A. Davidow
Allan L. Rathje

3,439,684
MAGNETIC FILLER BAR
Martin A. Davidow, Bettendorf, and Allan L. Rathje, Davenport, Iowa, assignors to J. I. Case Company, Racine, Wis., a corporation of Wisconsin
Filed Dec. 30, 1966, Ser. No. 606,214
Int. Cl. A01f 12/26
U.S. Cl. 130—27                                          6 Claims The present invention relates to harvesting mechanism and particularly to a concave device cooperating with the harvesting cylinder for adapting the concave structure for various types of crops.

The convention harvesting mechanism includes a cylinder driven at a certain speed and a concave located radially adjacent the cylinder. As is well-known, the crop material enters the space between the periphery of the cylinder and the surface of the concave. Of course, the periphery of the cylinder is a general term as the cylinder may be of the rub bar or spike tooth which are irregular surfaces, and also the surface of the concave is here used generally as the concave includes spaced bars and rods. Dependent upon the material being harvested, the distance between the cylinder and the concave may be increased or decreased. There are also different types of devices attachable to both the cylinder and the concave, here again dependent upon the material being harvested and the desired threshing action by the operator.

One device which has been used in recent years is an insert or bar which covers a portion of the concave openings. For instance, when harvesting grain which has a relatively soft shell or if there is concern about cracking or breaking the grain, a portion of the concave is made smoother so that the harvesting action is toned down. These devices may take the form of inserts, filler elements or longitudinal strips which are positioned between the threshing concave bars and which are bolted or secured to the concave itself. Since there may be times during the working day when the operator wishes to change the threshing action of the machine regarding the construction of the concave, it is desirable to have means for accomplishing this in a minimum amount of time. The present invention is an attachment for a concave which replaces and is an improvement over the previous type attachment.

The principal object of this invention is to provide filler means for a concave which requires little time to attach and detach.

Another object is to provide attachments which are simply and easily installed.

A further object is to provide a filler bar which requires no additional attaching means.

Another object is to provide a filler bar assembly of magnetic type.

Additional objects and advantages will become apparent from a reading of the following description taken together with the annexed drawings, in which:

FIGURE 1 is a side view of a thresher cylinder and a concave showing the invention;

FIG. 2 is an enlarged side view of a portion of FIG. 1;

FIG. 3 is a view taken on the line 3—3 of FIG. 2;

FIG. 4 is a side view of the filler bar showing the polarity of the parts; and

FIG. 5 is a frontal view of a concave showing a filler bar in place.

As seen in FIG. 1, there is shown a harvesting cylinder 10 which is supported from the frame of the combine, the frame not being shown. The cylinder in operation is driven by conventional means in a counter clockwise direction such that crop material entering from the left in FIG. 1 enters the space between the cylinder and a concave 12. Cylinder 10 includes rub or rasp bars 14, in the present instance, which act to thresh the grain from the straw or stalk. Concave 12 includes a plurality of concave bars 16 which bars normally extend the length of the cylinder. Of course, these bars may be made up in sections in some machines depending upon the particular construction. Bars 16 are spaced and secured by means of concave rods 18. Rods 18 are also spaced across the length of cylinder 10, it being understood that there are a plurality of these rods which are curved as shown in FIGS. 1, 2 and 5 and are of construction such that the concave may be adjusted nearer to or farther from the cylinder 10.

As stated above, the concave distance may be increased or decreased depending upon the crop being harvested. In the case of larger grains or those crops which do not require a high degree of threshing action, it is desirable to smooth out thre surface of the concave. The present invention provides an attachment for filling in the openings across the concave.

As seen in FIGS. 1 and 2, the attachment or filler assembly 20 includes a channel shaped element 22 and a flat member 24 secured to the element. Member 24 is secured to element 22 by means of an adhesive which is a manufactured product adapted for the type of materials used. Members 24 is further characterized by being magnetized as shown in FIG. 4. This feature enables the securing of the filler bar assembly 20 to the concave rods 18 without the use of bolts, clips or other fastening means. FIG. 4 shows member 22 having an N polarity and element 24 having an S polarity such that there is an attraction of the two parts and, of course, the addition of the adhesive maintains the parts secured. The concave bars are of N polarity to attract the magnetic bar 24. Since like poles repel and unlike poles attract, the rasp or rub bars 14 must be of N polarity to help maintain the repulsion effect to filler bar assembly 20.

FIG. 5 shows a frontal view of a concave with a filler bar in place. Of course, additional filler bars may be inserted, however, as here shown, it may be desirable to have a smoother threshing action at the front of the concave in the case of some crops.

It is thus seen that herein shown and described is an insert or filler bar for a threshing concave which accomplishes all the objects, advantages, and desired results of the invention. Certain of the spaces between the concave bars 16 may be filled by inserting the channel 22 with the attached bar 24 into the space. Channel 22 is aptly termed the concave magnetic filler bar and bar 24 is termed the magnetic bar. For instance, the operator may wish to fill every other space as shown in FIG. 1 or he may wish to fill only one of the spaces as shown in FIG. 5 The operator has only to slip the magnetic bar assembly into the space and he does not have to bother with inserting bolts and tightening nuts to keep the filler secured to the concave. This is a vast improvement in time saving which is important when a crop is ripe and is ready to harvest.

Variations in the foregoing description will no doubt occur to those skilled in the art and it is to be understood that all such variations are contemplated as within the scope of the invention. The invention is not intended to be taken as limited by the embodiment disclosed, nor in fact, in any manner except as defined in the following claims.

What is claimed as new and desired to be secured by Letters Patent of the United States is:

1. A filler bar assembly for a concave in a harvesting machine, the combination including:
   a plurality of spaced concave bars extending across a harvesting section of said machine, a plurality of spaced concave rods transversely connected with said concave bars,
   a filler bar positioned between said concave bars and contacting said concave rods for filling a portion of the space between said concave bars, and
   polarized means connected with said filler bar for securing said filler bar to said concave rods.

2. A filler bar assembly in accordance with claim 1 where said polarized means includes a bar positioned between said filler bar and said concave rods.

3. A filler bar assembly in accordance with claim 1 wherein said polarized means in a magnetized element positioned between said filler bar and said concave rods.

4. A filler bar assembly in accordance with claim 2 where said bar is adhesively connected with said filler bar.

5. A filler bar assembly in accordance with claim 1 wheerin said filler bar is a channel-shaped element for enclosing a portion of the space between said concave bars.

6. A filler bar assembly in accordance with claim 3 wherein said filler bar and said element are of opposite polarity.

References Cited

UNITED STATES PATENTS

| | | | |
|---|---|---|---|
| 2,159,664 | 5/1939 | Lindgren | 130—27.9 |
| 2,686,523 | 8/1954 | Young | 130—27.9 |
| 3,191,607 | 6/1965 | Baumeister et al. | 130—27.10 |

ANTONIO F. GUIDA, *Primary Examiner.*